United States Patent
Adiththan et al.

(10) Patent No.: US 12,365,354 B2
(45) Date of Patent: Jul. 22, 2025

(54) DRIVER ATTENTION DETECTION

(71) Applicant: GM Global Technology Operations LLC, Detroit, MI (US)

(72) Inventors: Arun Adiththan, Sterling Heights, MI (US); Vikramaditya Nimmagadda, Sterling Heights, MI (US); Aravind Gangumalla, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 182 days.

(21) Appl. No.: 18/455,118

(22) Filed: Aug. 24, 2023

(65) Prior Publication Data

US 2025/0065896 A1   Feb. 27, 2025

(51) Int. Cl.
| | |
|---|---|
| *B60W 50/08* | (2020.01) |
| *B60W 40/08* | (2012.01) |
| *B60W 50/14* | (2020.01) |
| *B60W 60/00* | (2020.01) |
| *G06V 20/59* | (2022.01) |
| *G08B 21/02* | (2006.01) |

(52) U.S. Cl.
CPC .......... *B60W 50/082* (2013.01); *B60W 40/08* (2013.01); *B60W 50/14* (2013.01); *B60W 60/0051* (2020.02); *G08B 21/0205* (2013.01); *B60W 2540/229* (2020.02); *B60W 2556/10* (2020.02); *B60W 2556/45* (2020.02); *G06V 20/597* (2022.01)

(58) Field of Classification Search
CPC .... B60W 50/082; B60W 40/08; B60W 50/14; B60W 60/0051; B60W 2540/229; B60W 2556/10; B60W 2556/45; B60W 2540/225; B60W 2050/146; G08B 21/0205; G06V 20/597
See application file for complete search history.

(56) References Cited

U.S. PATENT DOCUMENTS

| | | | |
|---|---|---|---|
| 9,924,085 B2* | 3/2018 | Intagliata | G06V 20/588 |
| 2014/0266660 A1* | 9/2014 | Slaton | B60W 40/08 |
| | | | 340/439 |

(Continued)

FOREIGN PATENT DOCUMENTS

| | | |
|---|---|---|
| DE | 102017200149 A1 | 7/2018 |
| DE | 102020202231 A1 | 8/2021 |

(Continued)

*Primary Examiner* — Thomas E Worden
*Assistant Examiner* — Madison B Emmett
(74) *Attorney, Agent, or Firm* — Vivacqua Crane, PLLC

(57) ABSTRACT

A system for monitoring a driver in a vehicle includes a driver monitoring system adapted to monitor the driver of the vehicle, a system controller in communication with the driver monitoring system and adapted to collect data from the driver monitoring system related to gaze behavior of the driver, classify the driver as one of a plurality of driver attention statuses based on the data from the driver monitoring system, the driver attention statuses including safe, borderline and unsafe, and, when the driver status is unsafe, prompt the driver, via a human machine interface (HMI), with questions adapted to test the alertness of the driver, receive, via the HMI, from the driver, responses to the questions, analyze the responses, and initiate responsive actions based on the responses from the driver.

20 Claims, 3 Drawing Sheets

(56) References Cited

U.S. PATENT DOCUMENTS

| | | | | |
|---|---|---|---|---|
| 2015/0287325 A1* | 10/2015 | Drescher | ............... | B60Q 9/008 |
| | | | | 340/435 |
| 2017/0232975 A1* | 8/2017 | Burk | ................... | B60W 50/14 |
| | | | | 701/48 |
| 2019/0018409 A1* | 1/2019 | Nickolaou | ............ | B60W 50/16 |
| 2021/0039657 A1* | 2/2021 | Guo | ..................... | B60W 40/09 |
| 2023/0192100 A1* | 6/2023 | Alexander | ............ | B60W 40/09 |
| | | | | 701/1 |

FOREIGN PATENT DOCUMENTS

| | | |
|---|---|---|
| DE | 102021101805 A1 | 7/2022 |
| DE | 102021109329 A1 | 10/2022 |
| WO | 03070504 A1 | 8/2003 |

* cited by examiner

DRIVER ATTENTION DETECTION

INTRODUCTION

The present disclosure relates to a system for detecting driver attention. Driver-monitoring systems typically use a driver-facing camera equipped with infrared light-emitting diodes (LEDs) or lasers so that it can "see" the driver's face, even at night, and see the driver's eyes even if the driver is wearing dark sunglasses. Advanced on-board software collects data points from the driver and creates an initial baseline of what the driver's normal, attentive state looks like. The software can then determine whether the driver is blinking more than usual, whether the eyes are narrowing or closing, and whether the head is tilting at an odd angle. It can also determine whether the driver is looking at the road ahead, and whether the driver is actually paying attention or just absent-mindedly staring.

If the system determines that the driver is distracted or drowsy, it could get the driver's attention by issuing audio alerts, lighting up a visual indicator on the dashboard or vibrating the seat. If the interior sensors indicate that the driver is distracted while the vehicle's external sensors determine it is about to have a collision, the system could automatically apply the brakes, using information from interior and exterior sensor fusion. Current systems however, do not collect feedback from the driver to verify the attention state of the driver.

Thus, while current driver monitoring systems achieve their intended purpose, there is a need for a new and improved system and method for detecting driver attention and verifying a driver status by collecting feedback from the driver.

SUMMARY

According to several aspects of the present disclosure, a method of monitoring a driver in a vehicle includes monitoring, with a driver monitoring system, a driver of a vehicle, collecting, with a system controller in communication with the driver monitoring system, data from the driver monitoring system related to gaze behavior of the driver, classifying, with the system controller, the driver as one of a plurality of driver attention statuses based on the data from the driver monitoring system, the driver attention statuses including safe, borderline and unsafe, and when the driver status is unsafe: prompting the driver, with the system controller, via a human machine interface (HMI), with questions adapted to test the alertness of the driver, receiving, with the system controller, via the HMI, from the driver, responses to the questions, analyzing, with the system controller, the responses, and initiating, with the system controller, responsive actions based on the responses from the driver.

According to another aspect, the prompting the driver, with the system controller, via a human machine interface (HMI), with questions adapted to test the alertness of the driver further includes prompting the driver with questions related to at least one of situational awareness of the driver and topics of interest for the driver.

According to another aspect, the classifying, with the system controller, the driver as one of a plurality of driver attention statuses based on the data from the driver monitoring system further includes calculating a probability that the driver attention status is unsafe, and, when the probability that the driver attention status is unsafe exceeds a pre-determined threshold, classifying the driver attention status as unsafe.

According to another aspect, the calculating a probability that the driver attention status is unsafe, further includes collecting data, from onboard systems within the vehicle, related to aspects of a current driving session, accessing a database of historical data related to classification of the driver attention status for the driver during past driving sessions, and predicting, using a machine learning algorithm, a probability that the driver attention status is unsafe based on the historical data.

According to another aspect, the analyzing, with the system controller, the responses further includes assessing if the response is correct, assessing the driver's comprehension of the question, assessing the speed of the driver's response to the question, and scoring the driver as one of "pass" or "fail" based on assessment of the driver's responses to the questions.

According to another aspect, when the system controller gives the driver a score of "pass", the initiating, with the system controller, responsive actions based on the responses from the driver further includes providing rewards to the driver.

According to another aspect, when the system controller gives the driver a score of "fail", the initiating, with the system controller, responsive actions based on the responses from the driver further includes providing a penalty to the driver.

According to another aspect, the providing a penalty to the driver includes at least one of disengaging, with the system controller, via communication with onboard systems within the vehicle, advanced driver assist features for a period of time, disabling, with the system controller, via communication with onboard systems within the vehicle, a driver's ability to engage advanced driver assist features for a period of time, sending an alert, via a wireless communication module, to an emergency service provider, sending an alert, via the wireless communication module, to an emergency contact, sending an alert, via the wireless communication module, to a parent/guardian, and engaging, with the system controller, via communication with a vehicle control module, an autonomous driving mode.

According to another aspect, the initiating, with the system controller, responsive actions based on the responses from the driver further includes, when the system controller gives the driver a score of "fail", accessing the database of historical data related to classification of the driver attention status for the driver during the current driving session, and identifying a pattern of instances where the driver was classified as unsafe during the current driving session, accessing the database of historical data related to classification of the driver attention status for the driver during past driving sessions, and identifying a pattern of instances where the driver was classified as unsafe during past driving sessions, and escalating the penalty provided to the driver based on the identified pattern of instances where the driver was classified as unsafe during at least one of the current driving session and past driving sessions.

According to several aspects of the present disclosure, a system for monitoring a driver in a vehicle includes a driver monitoring system adapted to monitor the driver of the vehicle, a system controller in communication with the driver monitoring system and adapted to collect data from the driver monitoring system related to gaze behavior of the driver, classify the driver as one of a plurality of driver attention statuses based on the data from the driver monitoring system, the driver attention statuses including safe, borderline and unsafe, and when the driver status is unsafe, prompt the driver, via a human machine interface (HMI), with questions adapted to test the alertness of the driver, receive, via the HMI, from the driver, responses to the questions, analyze the responses, and initiate responsive actions based on the responses from the driver.

According to another aspect, when prompting the driver, via the human machine interface (HMI), with questions adapted to test the alertness of the driver, the system controller is further adapted to prompt the driver with questions related to at least one of situational awareness of the driver and topics of interest for the driver.

According to another aspect, when classifying the driver as one of a plurality of driver attention statuses based on the data from the driver monitoring system, the system controller is further adapted to calculate a probability that the driver attention status is unsafe, and, when the probability that the driver attention status is unsafe exceeds a pre-determined threshold, classifying the driver attention status as unsafe.

According to another aspect, when classifying the driver as one of a plurality of driver statuses based on the data from the driver monitoring system, the system controller is further adapted to collect data, from onboard systems within the vehicle, related to aspects of a current driving session, access a database of historical data related to classification of the driver attention status for the driver during past driving sessions, predict, using a machine learning algorithm, a probability that the driver attention status is unsafe based on the historical data, and when the predicted probability that the driver attention status is unsafe exceeds the pre-determined threshold, classify the driver attention status as unsafe.

According to another aspect, when analyzing the responses, the system controller is further adapted to assess if the responses are correct, assess the driver's comprehension of the questions, assess the speed of the driver's response to the questions, and score the driver as one of "pass" or "fail" based on assessment of the driver's responses to the questions.

According to another aspect, when the system controller gives the driver a score of "pass", the system controller is further adapted to initiate responsive actions including providing rewards to the driver.

According to another aspect, when the system controller gives the driver a score of "fail", the system controller is further adapted to initiate responsive actions including providing a penalty to the driver.

According to another aspect, when providing a penalty to the driver, the system controller is adapted to at least one of: disengage, via communication with onboard systems within the vehicle, advanced driver assist features for a period of time, disable, via communication with onboard systems within the vehicle, a driver's ability to engage advanced driver assist features for a period of time, send an alert, via a wireless communication module, to an emergency service provider, send an alert, via the wireless communication module, to an emergency contact, send an alert, via the wireless communication module, to a parent/guardian, and engage, via communication with a vehicle control module, an autonomous driving mode.

According to another aspect, when providing a penalty to the driver, the system controller is further adapted to access the database of historical data related to classification of the driver attention status for the driver during the current driving session, and identify a pattern of instances where the driver was classified as unsafe during the current driving session, access the database of historical data related to classification of the driver attention status for the driver during past driving sessions, and identify a pattern of instances where the driver was classified as unsafe during past driving sessions, and escalate the penalty provided to the driver based on the identified pattern of instances where the driver was classified as unsafe during at least one of the current driving session and past driving sessions.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
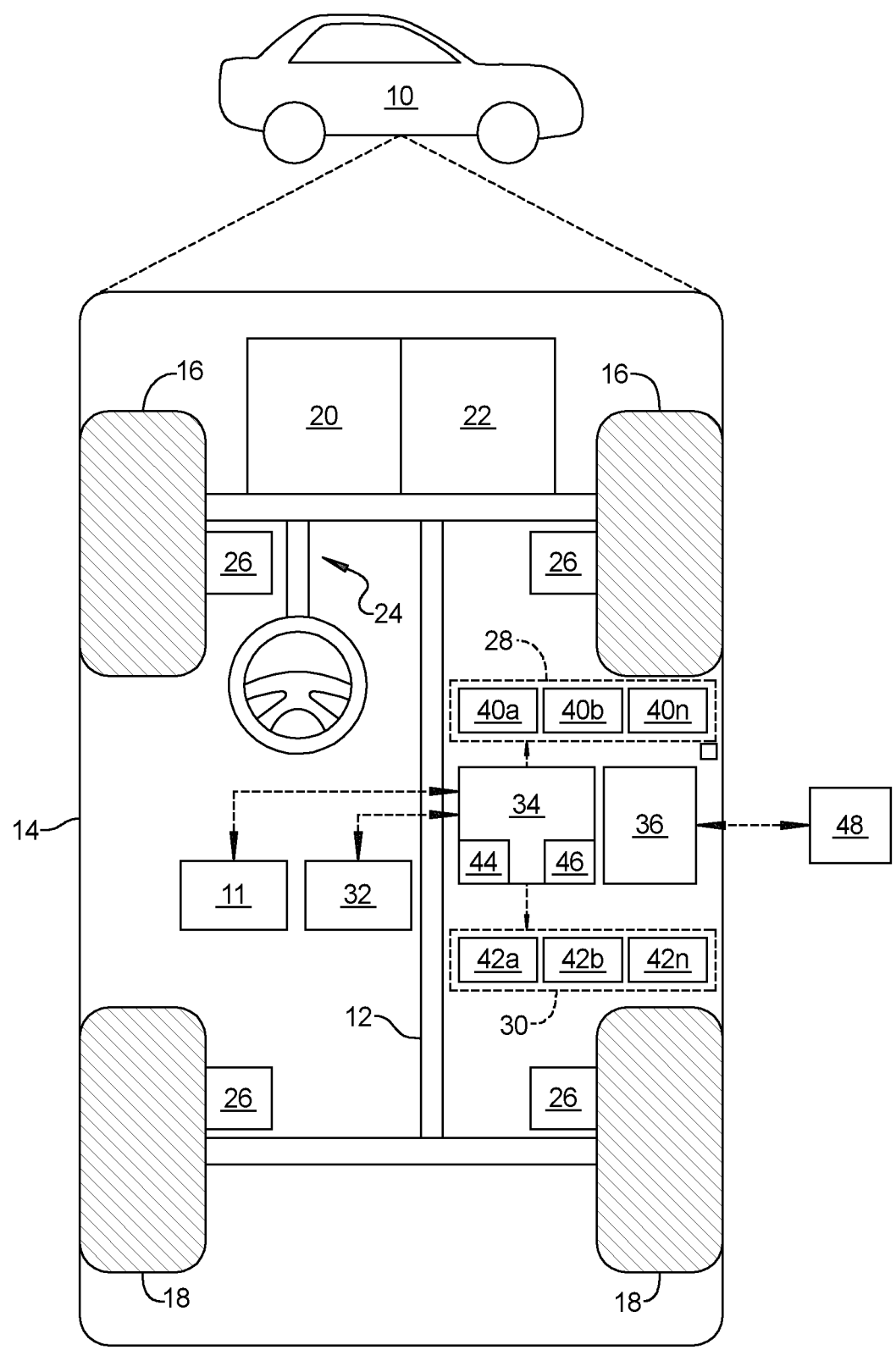
FIG. 1 is a schematic diagram of a system for monitoring a driver of an autonomous vehicle according to an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module or controller refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, as well as hospitals, healthcare and medical facilities, and consumer electronic components.

In accordance with an exemplary embodiment, FIG. 1 shows a vehicle 10 with an associated system 11 for monitoring driver attention in accordance with various embodiments. In general, the system 11 works in conjunction with other systems within the vehicle. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. The novel aspects of the present disclosure are also applicable to non-autonomous vehicles, wherein the vehicle will not have the ability to autonomously initiate actions of the vehicle.

As shown, the vehicle 10 generally includes a propulsion system 20, a transmission system 22, a steering system 24, a brake system 26, a sensor system 28, an actuator system 30, at least one data storage device 32, a vehicle controller 34, and a wireless communication module 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10.

In a non-limiting example wherein the plurality of sensing devices 40a-40n includes a camera, the plurality of sensing devices 40a-40n measures distances using an image processing algorithm configured to process images from the camera and determine distances between objects. In another non-limiting example, the plurality of vehicle sensors 40a-40n includes a stereoscopic camera having distance measurement capabilities. In one example, at least one of the plurality of sensing devices 40a-40n is affixed inside of the vehicle 10, for example, in a headliner of the vehicle 10, having a view through the windshield of the vehicle 10. In another example, at least one of the plurality of sensing devices 40a-40n is affixed outside of the vehicle 10, for example, on a roof of the vehicle 10, having a view of the environment surrounding the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The wireless communication module 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
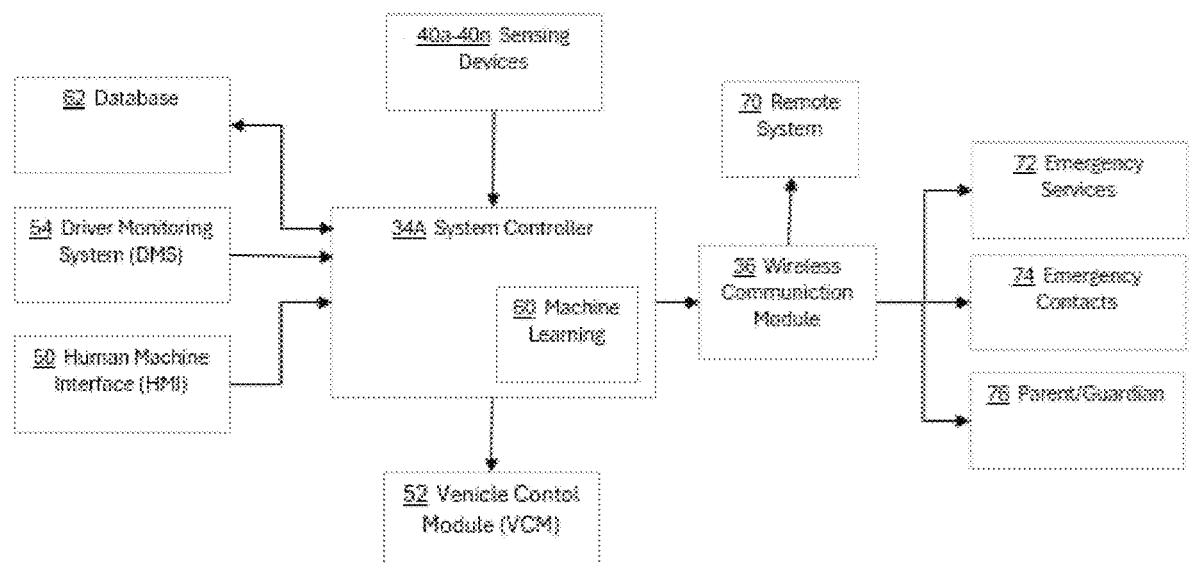
FIG. 2 is a schematic diagram of the system according to an exemplary embodiment.
Figure 3:
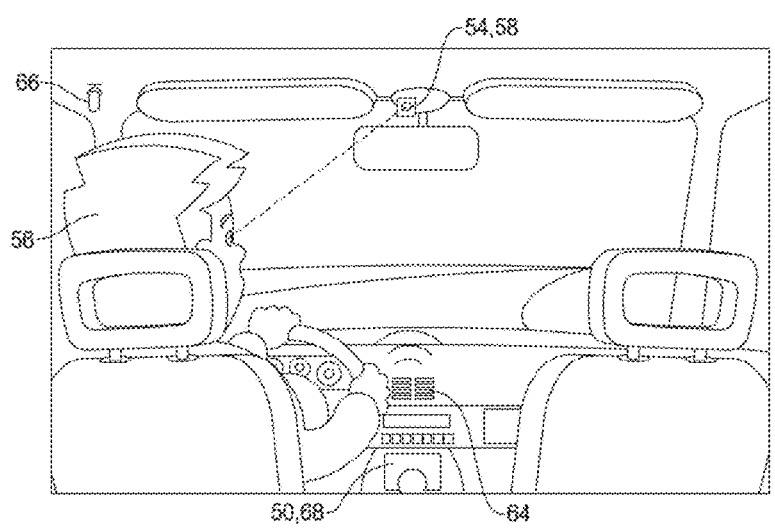
FIG. 3 is a schematic graphic illustrating a driver within a vehicle having a system of the present disclosure.

Referring to FIG. 2 a schematic diagram of the system 11 is shown. The system 11 includes a system controller 34A in communication with the plurality of sensing devices (on-board sensors) 40a-40n. The system controller 34A may be the vehicle controller 34, or the system controller 34A may be a separate controller in communication with the vehicle controller 34. In addition to the plurality of onboard sensors 40a-40n, the system controller 34A is in communication with a human machine interface (HMI) 50, a vehicle control module (VCM) 52, a driver monitoring system 54 and the wireless communication module 36.

The driver monitoring system 54 is adapted to monitor the driver 56 of the vehicle 10 with a camera 58 directed to the eyes and face of the driver 56. The system controller 34A is in communication with the driver monitoring system 54 and adapted to collect data from the driver monitoring system 54 related to gaze behavior of the driver 56, and to classify the driver 56 as one of a plurality of driver attention statuses based on the data from the driver monitoring system 54. In an exemplary embodiment, the driver attention statuses include "safe", "borderline" and "unsafe".

When classifying the driver 56 with one of the plurality of driver attention statuses based on the data from the driver monitoring system 54, the system controller 34A is further adapted to create a gaze model based on the data collected by the driver monitoring system 54, classify the gaze model as one of "safe", "borderline" or "unsafe", generate a probability of the classification of the gaze model, and classify the driver 56 as one of "safe", "borderline" or "unsafe".

The gaze model is a probability distribution of the observed gaze behavior of the driver 56 of the vehicle 10. In an exemplary embodiment, the gaze model is based on normalized neural network outputs. In one exemplary embodiment, a "safe" gaze model is a probability distribution of gaze behaviors that indicate the driver 56 of the vehicle 10 is paying close attention.

A "borderline" gaze model is a probability distribution of gaze behaviors that indicate the driver 56 of the vehicle 10 is paying attention, but not closely, such as when the vehicle 10 is in a lower level of autonomous mode (i.e., level 1, 2), and the driver 56 is only giving rudimentary attention to the driving characteristics of the vehicle 10, or in a non-autonomous vehicle, when the driver 56 is paying attention, but may be distracted by other activities or something drawing the driver's attention.

An "unsafe" gaze model is a probability distribution of gaze behaviors the indicate the driver 56 of the vehicle 10 is not paying attention to the point that it is not safe. It should be understood that there could be any suitable number of pre-defined gaze models and the exemplary embodiment described herein is meant to illustrate a non-limiting example.

The system controller 34A is adapted to classify the gaze model as one of "safe", "borderline" or "unsafe" by matching the gaze model to one of the "safe", "borderline" or "unsafe" gaze models. Using a neural network loss function, the gaze model is compared to the "safe", "borderline" and "unsafe" gaze models and the gaze model is classified as the one of the "safe", "borderline" and "unsafe" gaze models that most closely matches.

The driver monitoring system 54 further uses physiological signals to classify the driver attention status. The most accurate driver monitoring methods use physiological signals, such as brain waves and heart rate, pulse rate, and respiration rate signals. While electroencephalography (EEG) which monitors brain waves provides the best physiological signal to evaluate a driver's attention status, such data is difficult to obtain while driving. Another biological signal is an electrocardiogram (ECG) signal with heart rate and heart rate variability information. Other methods of collecting physiological data include collecting biological signals such as respiration (via sensors positioned within a seat and/or safety belt), gripping force and photoplethysmogram (PPG) (via sensors on the steering wheel), and muscle current (electromyography (EMG)). Such biological signals can also be received from wearable devices, such as a smartwatch, that are worn by the driver. Various techniques are employed to extract meaningful features from sensor readings, including time-series analysis, frequency-domain analysis, and spatial-temporal patterns. Different types of machine learning algorithms may be used for classification of the driver attention status, including but not limited to Long Short-Term Memory (LSTM), Gated Recurrent Unit (GRU), Decision Trees, Random Forests, Support Vector Machines (SVM), Neural Networks (NN), K-Nearest Neighbors (KNN), Gradient Boosting and Recurrent Neural Networks (RNN). Thus, the system controller 34A uses a machine learning algorithm 60 and machine learning techniques to predict lack of focus or medical distress, and therefore, an "unsafe" driving status.

When the system controller 34A classifies the driver 56 as one of "safe", "borderline" or "unsafe" based on the data from the driver monitoring system 54, the system controller 34A is further adapted to calculate a probability that the driver attention status is "safe", "borderline" or "unsafe". When the probability exceeds a threshold value for each driver attention status, then the driver attention status is classified as that status. Specifically, when the probability that the driver attention status is "unsafe" exceeds a pre-determined threshold, such as 50% for example, the system controller 34A classifies the driver attention status as "unsafe".

The system controller 34A collects data, from various onboard systems within the vehicle 10, related to aspects of a current driving session. This data is collected real time by the onboard sensors 40a-40n and the driver monitoring system 54 to gather real-time data related to the driver's state of attention at the moment. The attention history for the driver during the current driving session is represented as:

$AH_c$ = [session_id, timestamp, driver_id, $P(AS_1), P(AS_2), \ldots, P(AS_n)$, Reward/Penalty].

The timestamp is used to determine the frequency, consistency and severity of different attention states in a driving session. For example, the driver may not be fully attentive (unsafe) toward the right tail in a long driving session.

The system controller 34A further accesses a database 62 of historical data related to classification of the driver status for the driver 56 during past driving sessions. The database 62 may be onboard the vehicle 10, or may be cloud-based. Each time the vehicle 10 is driven, the system controller 34A identifies the driver 56, and collects data related to the driving attention status of that driver 56 and stores that data within the database 62. Then, during any current driving session, the system controller 34A can access historical data from past driving sessions for that driver 56 to compare how the driver 56 is behaving during the current driving session to the way that driver 56 has behaved during past driving sessions. The attention history for past driving sessions is represented as:

$AH_P$ = [session_id, timestamp, driver_id, $P(AS_1), P(AS_2), \ldots, P(AS_n)$, Reward/Penalty], where the probability and reward/penalty values are statistically computed (averaged) over an entire driving session.

The system controller 34A then predicts, using the machine learning algorithm 60, a probability that the driver status is "safe", "borderline" or "unsafe" based on the real-time data and the historical data, wherein:

$$P(AS_{safe}) + P(AS_{borderline}) + P(AS_{unsafe}) = 1;$$

and
 $P(AS_{safe})$ is the probability that the driver's 56 attention state is "safe";
 $P(AS_{borderline})$ is the probability that the driver's 56 attention state is "borderline"; and
 $P(AS_{unsafe})$ is the probability that the driver's 56 attention state is "unsafe".

It should be understood that there could be any number of driver attention states, n, wherein:

$$P(AS_1) + P(AS_2) + P(AS_n) = 1,$$

and wherein, each of the n attention states is classified as one of "safe", "borderline" or "unsafe", and wherein:

$$P(AS_{safe}) = \sum_{j=0}^{k} P(AS_j),$$

$$k < n;$$

$$P(AS_{borderline}) = \sum_{j=0}^{k} P(AS_j),$$

$$k < n;$$

and $$P(AS_{unsafe}) = \sum_{j=0}^{k} P(AS_j),$$

$$k < n.$$

The probability that a driver attention status is unsafe is related to the gaze behavior of the driver 56 and physiological signals from the driver 56, as monitored by the driver monitoring system 54, as well as predictive probability based on past driving sessions. For example, accessing past driving sessions may reveal that in many instances, the driver 56 exhibited unsafe driving behavior after driving non-stop for over three hours. Thus, if the current driving session has lasted over three hours, the system controller 34A will use machine learning to predict that the driver 56 will lose focus and put a higher probability on the driving attention status being "unsafe".

When the predicted probability that the driver attention status is unsafe, $P(AS_{unsafe})$, exceeds the pre-determined threshold, the system controller 34A classifies the driver status as "unsafe", and when the driver attention status is classified as "unsafe", the system controller 34A further prompts the driver 56, via the HMI 50, with questions adapted to test the alertness of the driver 56, receives, via the HMI 50, from the driver 56, responses to the questions, analyzes the responses to the questions, and initiates responsive actions based on the responses from the driver 56.

In an exemplary embodiment, when prompting the driver 56, via the HMI 50, with questions adapted to test the alertness of the driver 56, the system controller 34A is further adapted to prompt the driver 56 with questions related to at least one of situational awareness of the driver 56 and topics of interest for the driver 56. Situation awareness questions may be, for example, "How many lanes are there on the roadway?", "What color is the neighboring vehicle to your right?", "What is your current speed?". Questions related to topics of interest for the driver 56 may include questions related to movies, music, politics, etc., where the driver's interests in such topics are obtained via direct entry by the driver 56, or by accessing, with the system controller 34A, the driver's 56 personal devices and/or social media accounts. The questions may be open-ended, specific, multiple choice or yes/no questions.

In an exemplary embodiment, the system controller 34A will prompt the driver 56 with questions audibly via a speaker 64 connected to the HMI 50 wherein, the driver 56 can provide verbal responses to the questions that are picked up by a microphone 66 connected to the HMI 50. The system controller 34A will use natural language understanding (NLU) techniques to process the responses. In another exemplary embodiment, the system controller 34A will prompt the driver 56 with questions visually, by displaying the questions on a touch screen display 68 associated with the HMI 50, wherein, the driver 56 may provide verbal responses or may input responses via the touch screen display 68. For example, the system controller 34A may provide the questions either audibly or via the HMI 50 touch screen display 68, or both verbally and via the touch screen display 68, giving the driver 56 the option of how to provide the responses. In another example, if the system controller 34A identifies that the driver 56 is hearing impaired, based on accessing driver attributes provided ahead of time, the system controller 34A will provide the questions and facilitate receiving the responses via the touch screen display 68.

In an exemplary embodiment, when analyzing the responses, the system controller 34A is further adapted to assess if the responses are correct, assess the driver's comprehension of the questions, assess the speed of the driver's response to the questions, and score the driver as one of "pass" or "fail" based on assessment of the driver's responses to the questions.

The assessment of the responses is not necessarily dominated by right and wrong answers, for example, when assessing the responses to determine if the driver status is "unsafe", a response that is not closely related to the question is worse than an incorrect answer. For example, if the vehicle 10 is traveling on a road having four lanes, and the question is "how many lanes are there on the road you are traveling?", a response of "I am traveling on I-65 southbound" would be a greater indication that the driver 56 is un-focused than a response of "There are three lanes", which while incorrect, shows that the driver 56, at a minimum, comprehended the question correctly. Further, a correct response to a question, given several minutes after the question was prompted, is an indication that, even though the response was correct, the driver 56 may be un-focused, resulting in the driver 56 receiving a "fail" score.

In an exemplary embodiment, when the system controller 34A gives the driver a score of "pass", the system controller 34A is further adapted to take responsive actions including providing rewards to the driver 56. For example, in response to a score of "pass", the system controller 34A may provide an audible or displayed message providing positive feedback to the driver 56. In another example, in response to a score of "pass", the system controller 34A, via communication with a remote system 70 that is supported by a third party, such as the vehicle 10 manufacturer, may provide the driver 56 with points toward a reward system, wherein such points could be applied towards vehicle maintenance service, charging credit (in the case of an electric vehicle), or other products/services related to the vehicle 10.

In another exemplary embodiment, when the system controller 34A gives the driver 56 a score of "fail", the system controller 34A is further adapted to take responsive actions including providing a penalty to the driver 56. For example, when providing a penalty to the driver 56, the system controller 34A is adapted to at least one of (1) disengage, via communication with onboard systems within the vehicle 10, advanced driver assist features for a period of time; (2) disable, via communication with onboard systems within the vehicle 10, a driver's ability to engage such advanced driver assist features for a period of time; (3) send an alert, via the wireless communication module 36, to an emergency service provider 72, such as police or an ambulance (such as in the case of medical distress); (4) send an alert, via the wireless communication module 36, to an emergency contact 74, as indicated via communication between the system controller 34A and a personal device of the driver 56, or as provided to the system controller 34A directly by the driver 56 ahead of time; (5) in the case of a driver 56 who is a minor, send an alert, via the wireless communication module 36, to a parent/guardian 76, wherein preferences of when and why to send such alerts is set up within the system controller 34A by the parent/guardian 76 ahead of time; and (6) in the case of an autonomous vehicle 10, engage, via communication with the vehicle control module 52, an autonomous driving mode, wherein the vehicle control module 52 takes over primary control of the vehicle 10 from the driver 56.

In another exemplary embodiment, when providing a penalty to the driver 56, the system controller 34A is further adapted to access the database 62 of historical data related to classification of the driver status for the driver 56 during the current driving session, and identify a pattern of instances where the driver 56 was classified as unsafe during the current driving session, and to access the database 62 of historical data related to classification of the driver status for the driver 56 during past driving sessions, and identify a pattern of instances where the driver 56 was classified as unsafe during past driving sessions. If the system controller 34A identifies patterns where the driver status is consistently and repeatedly classified as "unsafe" during the current and/or past driving sessions, the system controller 34A will escalate the penalty provided to the driver 56. In another exemplary embodiment, the database 62 can be accessed when a driver 56 is using the vehicle 10 to obtain learned driver behavior patterns from other vehicles that the driver 56 uses, or to upload driver behavior patterns from the vehicle 10 to the database 62, wherein such driver behavior patterns can be accessed by such other vehicles that the driver 56 uses.

For instance, if the driver status is classified as "unsafe", and the driver 56 is scored as "fail" after responding to questions prompted by the system controller 34A, the system controller 34A may provide a penalty by disengaging advanced driver assist features or disabling the driver's ability to engage such advanced driver assist features for a period of time. However, if the system controller 34A identifies patterns where the driver status is consistently and repeatedly classified as "unsafe" during the current and/or past driving sessions, the system controller 34A may escalate the penalty provided to the driver 56, and in addition to disengaging advanced driver assist features or disabling the driver's ability to engage such advanced driver assist features for a period of time, the system controller 34A may also send an alert to an emergency service provider 72, an emergency contact 74, or a parent/guardian 76. In extreme circumstances, the penalty may be escalated to a point where, in the case of an autonomous vehicle, an autonomous mode is engaged, and control of the vehicle 10 is taken away from the driver 56.

Figure 4:
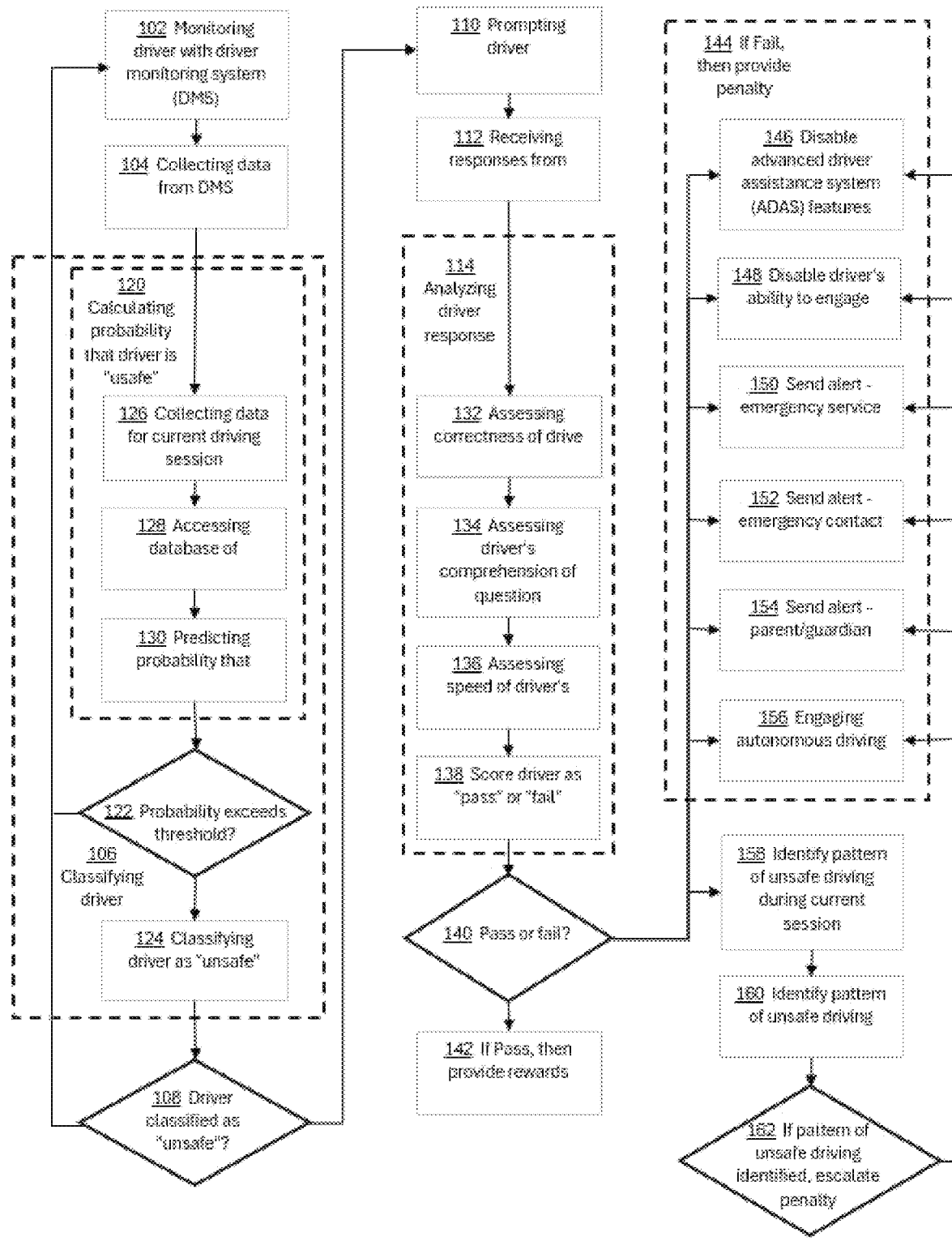
FIG. 4 is a flow chart illustrating a method in accordance with an exemplary embodiment of the present disclosure.

Referring to FIG. 4, a method 100 of monitoring a driver 56 in a vehicle 10 includes, beginning at block 102, monitoring, with a driver monitoring system 54, a driver 56 of a vehicle 10, moving to block 104, collecting, with a system controller 34A in communication with the driver monitoring system 54, data from the driver monitoring system 54 related to gaze behavior of the driver 56, moving to block 106, classifying, with the system controller 34A, the driver 56 as one of a plurality of driver attention statuses based on the data from the driver monitoring system 54, the driver attention statuses including safe, borderline and unsafe, and, at block 108, when the driver attention status is unsafe, moving to block 110, prompting the driver 56, with the system controller 34A, via a human machine interface (HMI) 50, with questions adapted to test the alertness of the driver 56, moving to block 112, receiving, with the system controller 34A, via the HMI 50, from the driver 56, responses to the questions, moving to block 114, analyzing, with the system controller 34A, the responses, and, moving to block 116, initiating, with the system controller 34A, responsive actions based on the responses from the driver 56. At block 108, if the driver attention status is not unsafe, then the method reverts back to block 102, as indicated by line 118.

In an exemplary embodiment, the prompting the driver 56, with the system controller 34A, via the human machine interface (HMI) 50, with questions adapted to test the alertness of the driver 56 at block 110 further includes prompting the driver 56 with questions related to at least one of situational awareness of the driver 56 and topics of interest for the driver 56.

In another exemplary embodiment, the classifying, with the system controller 34A, the driver 56 as one of a plurality of driver attention statuses based on the data from the driver monitoring system 54 at block 106 further includes, moving to block 120 calculating a probability that the driver attention status is unsafe, and, at block 122, when the probability that the driver status is unsafe exceeds a pre-determined threshold, moving to block 124, classifying the driver attention status as unsafe.

In another exemplary embodiment, the calculating, with the system controller, a probability that the driver attention status is unsafe at block 120 further includes, moving to block 126, collecting data, from onboard systems within the vehicle 10, related to aspects of a current driving session, moving to block 128, accessing a database 62 of historical data related to classification of the driver attention status for the driver 56 during past driving sessions, and, moving to block 130, predicting, using a machine learning algorithm 60, a probability that the driver attention status is unsafe based on the historical data.

In another exemplary embodiment the analyzing, with the system controller 34A, the responses at block 114 further includes, moving to block 132, assessing if the response is correct, moving to block 134, assessing the driver's comprehension of the question, moving to block 136, assessing the speed of the driver's response to the questions, and, moving to block 138, scoring the driver 56 as one of "pass" or "fail" based on assessment of the driver's responses to the questions.

In another exemplary embodiment, moving to block 140, if the system controller 34A gives the driver 56 a score of "pass", the initiating, with the system controller 34A, responsive actions based on the responses from the driver 56 at block 116 further includes, moving to block 142, providing rewards to the driver 56.

In still another exemplary embodiment, moving again to block 140, if the system controller 34A gives the driver 56 a score of "fail", the initiating, with the system controller 34A, responsive actions based on the responses from the driver 56 at block 116 further includes, moving to block 144, providing a penalty to the driver 56.

In another exemplary embodiment, the providing a penalty to the driver 56 at block 144 includes at least one of, moving to block 146, disengaging, with the system controller 34A, via communication with onboard systems within the vehicle 10, advanced driver assist features for a period of time, moving to block 148, disabling, with the system controller, via communication with onboard systems within the vehicle, a driver's ability to engage advanced driver assist features for a period of time, moving to block 150, sending an alert, via a wireless communication module 36, to an emergency service provider 72, moving to block 152, sending an alert, via the wireless communication module 36, to an emergency contact 74, moving to block 154, sending an alert, via the wireless communication module 36, to a parent/guardian 76, and, moving to block 156, engaging, with the system controller 34A, via communication with a vehicle control module 52, an autonomous driving mode.

In another exemplary embodiment, the initiating, with the system controller 34A, responsive actions based on the responses from the driver 56 at block 116 further includes, moving again to block 140, when the system controller 34A gives the driver a score of "fail", moving to block 158, accessing the database 62 of historical data related to classification of the driver status for the driver 56 during the current driving session, and identifying a pattern of instances where the driver 56 was classified as unsafe during the current driving session, moving to block 160, accessing the database 62 of historical data related to classification of the driver attention status for the driver 56 during past driving sessions, and identifying a pattern of instances where the driver was classified as unsafe during past driving sessions, and, moving to block 162, escalating the penalty provided to the driver 56 when an identified pattern of instances where the driver 56 was classified as unsafe during at least one of the current driving session and past driving sessions exists.

A system 11 and method 100 of the present disclosure offers the advantage of verifying an inferred driver status by prompting the driver with questions and analyzing the responses. This provides a more detailed, accurate and tailored way of monitoring and predicting the driver status.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of monitoring a driver in a vehicle, comprising:
   monitoring, with a driver monitoring system, a driver of a vehicle;
   collecting, with a system controller in communication with the driver monitoring system, data from the driver monitoring system related to gaze behavior of the driver;
   classifying, with the system controller, the driver as one of a plurality of driver attention statuses based on the data from the driver monitoring system, the driver attention statuses including safe, borderline and unsafe; and
   when the driver status is unsafe:
      prompting the driver, with the system controller, via a human machine interface (HMI), with questions adapted to test the alertness of the driver;
      receiving, with the system controller, via the HMI, from the driver, responses to the questions;
      analyzing, with the system controller, the responses;
      scoring the driver as one of "pass" or "fail" based on assessment of the driver's responses to the questions;
      initiating, with the system controller, responsive actions, including:
         when the driver score is "pass", providing, with the system controller, via communication with a remote system that is supported by a third party, points toward a reward system, wherein such points can be applied towards vehicle maintenance service, charging credit for an electric vehicle, or other products and/or services related to the vehicle; and
         when the driver score is "fail", providing, with the system controller, via communication with a vehicle control module, a penalty to the driver including engaging an autonomous driving mode.

2. The method of claim 1, wherein the prompting the driver, with the system controller, via a human machine interface (HMI), with questions adapted to test the alertness of the driver further includes prompting the driver with questions related to at least one of situational awareness of the driver and topics of interest for the driver.

3. The method of claim 2, wherein, the classifying, with the system controller, the driver as one of a plurality of driver attention statuses based on the data from the driver monitoring system further includes calculating a probability that the driver attention status is unsafe, and, when the probability that the driver attention status is unsafe exceeds a pre-determined threshold, classifying the driver attention status as unsafe.

4. The method of claim 3, wherein, the calculating a probability that the driver attention status is unsafe, further includes:
   collecting data, from onboard systems within the vehicle, related to aspects of a current driving session;
   accessing a database of historical data related to classification of the driver attention status for the driver during past driving sessions; and
   predicting, using a machine learning algorithm, a probability that the driver attention status is unsafe based on the historical data.

5. The method of claim 4, wherein the scoring the driver as one of "pass" or "fail" based on assessment of the driver's responses to the questions further includes:
   assessing if the response is correct;
   assessing the driver's comprehension of the question; and
   assessing the speed of the driver's response to the question.

6. The method of claim 5, wherein the providing a penalty to the driver further includes
   disengaging, with the system controller, via communication with onboard systems within the vehicle, advanced driver assist features for a period of time.

7. The method of claim 6, wherein the providing a penalty to the driver further includes disabling, with the system controller, via communication with onboard systems within the vehicle, a driver's ability to engage advanced driver assist features for a period of time.

8. The method of claim 7, wherein the providing a penalty to the driver further includes:
   sending an alert, via a wireless communication module, to an emergency service provider;
   sending an alert, via the wireless communication module, to an emergency contact; and
   sending an alert, via the wireless communication module, to a parent/guardian.

9. The method of claim 8, wherein the initiating, with the system controller, responsive actions based on the responses from the driver further includes, when the system controller gives the driver a score of "fail":
   accessing the database of historical data related to classification of the driver attention status for the driver during the current driving session, and identifying a pattern of instances where the driver was classified as unsafe during the current driving session;
   accessing the database of historical data related to classification of the driver attention status for the driver during past driving sessions, and identifying a pattern of instances where the driver was classified as unsafe during past driving sessions; and
   escalating the penalty provided to the driver based on the identified pattern of instances where the driver was classified as unsafe during at least one of the current driving session and past driving sessions.

10. A system for monitoring a driver in a vehicle, comprising:
   a driver monitoring system adapted to monitor the driver of the vehicle;
   a system controller in communication with the driver monitoring system and adapted to:
      collect data from the driver monitoring system related to gaze behavior of the driver;
      classify the driver as one of a plurality of driver attention statuses based on the data from the driver monitoring system, the driver attention statuses including safe, borderline and unsafe; and
      when the driver status is unsafe:
         prompt the driver, via a human machine interface (HMI), with questions adapted to test the alertness of the driver;
         receive, via the HMI, from the driver, responses to the questions;
         analyze the responses;
         score the driver as one of "pass" or "fail" based on assessment of the driver's responses to the questions; and
         initiate responsive actions including:

when the driver score is "pass", provide, via communication with a remote system that is supported by a third party, points toward a reward system, wherein such points can be applied towards vehicle maintenance service, charging credit for an electric vehicle, or other products and/or services related to the vehicle; and when the driver score is "fail", provide, via communication with a vehicle control module, a penalty to the driver including engaging an autonomous driving mode.

11. The system of claim 10, wherein, when prompting the driver, via the human machine interface (HMI), with questions adapted to test the alertness of the driver, the system controller is further adapted to prompt the driver with questions related to at least one of situational awareness of the driver and topics of interest for the driver.

12. The system of claim 11, wherein, when classifying the driver as one of a plurality of driver attention statuses based on the data from the driver monitoring system, the system controller is further adapted to calculate a probability that the driver attention status is unsafe, and, when the probability that the driver attention status is unsafe exceeds a pre-determined threshold, classifying the driver attention status as unsafe.

13. The system of claim 12, wherein, when classifying the driver as one of a plurality of driver statuses based on the data from the driver monitoring system, the system controller is further adapted to:
collect data, from onboard systems within the vehicle, related to aspects of a current driving session;
access a database of historical data related to classification of the driver attention status for the driver during past driving sessions;
predict, using a machine learning algorithm, a probability that the driver attention status is unsafe based on the historical data; and
when the predicted probability that the driver attention status is unsafe exceeds the pre-determined threshold, classify the driver attention status as unsafe.

14. The system of claim 13, wherein, when scoring the driver as one of "pass" or "fail" based on assessment of the driver's responses to the questions, the system controller is further adapted to:
assess if the responses are correct;
assess the driver's comprehension of the questions; and
assess the speed of the driver's response to the questions.

15. The system of claim 14, wherein when providing a penalty to the driver, the system controller is further adapted to
disengage, via communication with onboard systems within the vehicle, advanced driver assist features for a period of time.

16. The system of claim 15, wherein when providing a penalty to the driver, the system controller is further adapted to disable, via communication with onboard systems within the vehicle, a driver's ability to engage advanced driver assist features for a period of time.

17. The system of claim 16, wherein when providing a penalty to the driver, the system controller is further adapted to:
send an alert, via a wireless communication module, to an emergency service provider;
send an alert, via the wireless communication module, to an emergency contact; and
send an alert, via the wireless communication module, to a parent/guardian.

18. The system of claim 17, wherein, when providing a penalty to the driver, the system controller is further adapted to:
access the database of historical data related to classification of the driver attention status for the driver during the current driving session, and identify a pattern of instances where the driver was classified as unsafe during the current driving session;
access the database of historical data related to classification of the driver attention status for the driver during past driving sessions, and identify a pattern of instances where the driver was classified as unsafe during past driving sessions; and
escalate the penalty provided to the driver based on the identified pattern of instances where the driver was classified as unsafe during at least one of the current driving session and past driving sessions.

19. A vehicle having a system for monitoring a driver, the system comprising:
a driver monitoring system adapted to monitor the driver of the vehicle;
a system controller in communication with the driver monitoring system and adapted to:
collect data from the driver monitoring system related to gaze behavior of the driver;
collect data, from onboard systems within the vehicle, related to aspects of a current driving session;
access a database of historical data related to classification of a driver attention status for the driver during past driving sessions;
predict, using a machine learning algorithm, a probability that the driver attention status is unsafe based on the historical data; and
when the predicted probability that the driver attention status is unsafe exceeds the pre-determined threshold, classify the driver attention status as unsafe; and
when the driver attention status is unsafe:
prompt the driver, via a human machine interface (HMI), with questions related to at least one of situational awareness of the driver and topics of interest for the driver;
receive, via the HMI, from the driver, responses to the questions;
assess if the responses are correct;
assess the driver's comprehension of the questions;
assess the speed of the driver's response to the questions; and
score the driver as one of "pass" or "fail" based on assessment of the driver's responses to the questions;
initiate responsive actions including:
when the driver score is "pass", provide, via communication with a remote system that is supported by a third party, points toward a reward system, wherein such points can be applied towards vehicle maintenance service, charging credit for an electric vehicle, or other products and/or services related to the vehicle; and
when the driver score is "fail", provide, via communication with a vehicle control module, a penalty to the driver including engaging an autonomous driving mode.

20. The vehicle of claim 19, wherein when providing a penalty to the driver, the system controller is further adapted to:
- disengage, via communication with onboard systems within the vehicle, advanced driver assist features for a period of time;
- disable, via communication with onboard systems within the vehicle, a driver's ability to engage advanced driver assist features for a period of time;
- send an alert, via a wireless communication module, to an emergency service provider;
- send an alert, via the wireless communication module, to an emergency contact; and
- send an alert, via the wireless communication module, to a parent/guardian.

* * * * *